US012573631B2

(12) United States Patent
Kido

(10) Patent No.: US 12,573,631 B2
(45) Date of Patent: Mar. 10, 2026

(54) LITHIUM ION SECONDARY BATTERY

(71) Applicant: TDK CORPORATION, Tokyo (JP)

(72) Inventor: Ryosuke Kido, Tokyo (JP)

(73) Assignee: TDK CORPORATION, Tokyo (JP)

( * ) Notice: Subject to any disclaimer, the term of this patent is extended or adjusted under 35 U.S.C. 154(b) by 779 days.

(21) Appl. No.: 17/722,844

(22) Filed: Apr. 18, 2022

(65) Prior Publication Data

US 2022/0393167 A1 Dec. 8, 2022

(30) Foreign Application Priority Data

May 26, 2021 (JP) ................................. 2021-088274

(51) Int. Cl.
| | |
|---|---|
| *H01M 4/62* | (2006.01) |
| *H01M 4/134* | (2010.01) |
| *H01M 4/36* | (2006.01) |
| *H01M 4/58* | (2010.01) |
| *H01M 10/0525* | (2010.01) |
| *H01M 10/0568* | (2010.01) |
| *H01M 10/0569* | (2010.01) |
| *H01M 4/02* | (2006.01) |
| *H01M 4/38* | (2006.01) |

(52) U.S. Cl.
CPC ............. *H01M 4/62* (2013.01); *H01M 4/134* (2013.01); *H01M 4/366* (2013.01); *H01M 4/58* (2013.01); *H01M 10/0525* (2013.01); *H01M 10/0568* (2013.01); *H01M 10/0569* (2013.01); *H01M 2004/021* (2013.01); *H01M 2004/027* (2013.01); *H01M 4/386* (2013.01)

(58) Field of Classification Search
None
See application file for complete search history.

(56) References Cited

U.S. PATENT DOCUMENTS

| | | | |
|---|---|---|---|
| 6,010,806 A | 1/2000 | Yokoyama et al. | |
| 6,210,835 B1 | 4/2001 | Arai | |
| 6,495,293 B1 | 12/2002 | Arai et al. | |
| 6,927,001 B1 | 8/2005 | Hamamoto et al. | |
| 10,424,779 B1 * | 9/2019 | Bhardwaj | H01M 10/052 |
| 2002/0037458 A1 | 3/2002 | Yamaguchi et al. | |
| 2002/0081496 A1 | 6/2002 | Tsujioka et al. | |
| 2003/0175598 A1 | 9/2003 | Otsuki et al. | |

(Continued)

FOREIGN PATENT DOCUMENTS

| | | | | |
|---|---|---|---|---|
| CN | 110828897 A | * | 2/2020 | H01M 10/058 |
| CN | 111313086 A | | 6/2020 | |

(Continued)

OTHER PUBLICATIONS

CN110828897A English Translation Google Patents (Year: 2020).*

*Primary Examiner* — Mark Ruthkosky

(57) ABSTRACT

A lithium ion secondary battery includes: a positive electrode, a negative electrode, a separate located between the positive electrode and the negative electrode, and an electrolytic solution. The negative electrode includes a negative electrode active material which contains a material containing silicon and carbon, and a compound containing a first element. The electrolytic solution contains an imide salt which contains the first element and an imide anion. The first element is any one or more elements selected from the group consisting of K, Na, Mg, Ca, Cs, Al, and Zn.

5 Claims, 2 Drawing Sheets

(56) References Cited

U.S. PATENT DOCUMENTS

| | | |
|---|---|---|
| 2003/0180608 A1 | 9/2003 | Mori et al. |
| 2003/0180618 A1 | 9/2003 | Inoue et al. |
| 2003/0224242 A1 | 12/2003 | Kaito et al. |
| 2004/0009393 A1 | 1/2004 | Kim et al. |
| 2004/0038133 A1 | 2/2004 | Yamaguchi et al. |
| 2004/0043300 A1 | 3/2004 | Utsugi et al. |
| 2004/0091786 A1 | 5/2004 | Unoki et al. |
| 2004/0137324 A1* | 7/2004 | Itaya ............... H01M 4/505 |
| | | 429/188 |
| 2004/0170903 A1 | 9/2004 | Fukuoka et al. |
| 2004/0259000 A1 | 12/2004 | Adachi et al. |
| 2005/0014072 A1 | 1/2005 | Yamaguchi et al. |
| 2005/0277027 A1 | 12/2005 | Kim et al. |
| 2007/0015063 A1 | 1/2007 | Ogawa et al. |
| 2007/0072084 A1 | 3/2007 | Nishie |
| 2007/0092803 A1 | 4/2007 | Nakanishi et al. |
| 2007/0196736 A1 | 8/2007 | Takahashi et al. |
| 2007/0202406 A1 | 8/2007 | Takahashi et al. |
| 2007/0212615 A1 | 9/2007 | Jost et al. |
| 2008/0020285 A1 | 1/2008 | Horikawa |
| 2008/0145763 A1 | 6/2008 | Koh et al. |
| 2008/0241704 A1 | 10/2008 | Abe et al. |
| 2009/0023074 A1 | 1/2009 | Matsui et al. |
| 2009/0053598 A1 | 2/2009 | Abe et al. |
| 2009/0086408 A1 | 4/2009 | Koh et al. |
| 2009/0111030 A1 | 4/2009 | Hojo et al. |
| 2009/0130567 A1 | 5/2009 | Segawa |
| 2009/0155686 A1 | 6/2009 | Takezawa |
| 2009/0226808 A1 | 9/2009 | Hiwara et al. |
| 2009/0246631 A1 | 10/2009 | Hojo et al. |
| 2009/0291370 A1 | 11/2009 | Kim et al. |
| 2009/0311611 A1 | 12/2009 | Wu et al. |
| 2009/0325076 A1 | 12/2009 | Matsui et al. |
| 2010/0018034 A1 | 1/2010 | Miyasaka et al. |
| 2010/0062344 A1 | 3/2010 | Koh et al. |
| 2010/0124708 A1 | 5/2010 | Matsui et al. |
| 2010/0159334 A1 | 6/2010 | Kashima et al. |
| 2010/0209778 A1 | 8/2010 | Jouanneau-Si Larbi et al. |
| 2011/0008681 A1 | 1/2011 | Koh et al. |
| 2011/0081583 A1 | 4/2011 | Sugimoto et al. |
| 2011/0091767 A1 | 4/2011 | Hojo et al. |
| 2011/0123871 A1 | 5/2011 | Nakagawa et al. |
| 2011/0236765 A1 | 9/2011 | Matsui et al. |
| 2011/0274982 A1 | 11/2011 | Kaneko et al. |
| 2012/0002349 A1 | 1/2012 | Ito et al. |
| 2012/0009480 A1 | 1/2012 | Ohashi et al. |
| 2012/0129035 A1 | 5/2012 | Takahata et al. |
| 2012/0129055 A1 | 5/2012 | Takahata et al. |
| 2012/0156555 A1 | 6/2012 | Hojo et al. |
| 2012/0156572 A1 | 6/2012 | Hojo et al. |
| 2012/0164519 A1 | 6/2012 | Lee et al. |
| 2013/0004836 A1 | 1/2013 | Otsuka et al. |
| 2013/0034774 A1 | 2/2013 | Yoshida et al. |
| 2013/0052543 A1 | 2/2013 | Ihara et al. |
| 2013/0078511 A1 | 3/2013 | Ikeda et al. |
| 2013/0295454 A1* | 11/2013 | Huang ............... H01M 4/625 |
| | | 252/511 |
| 2014/0045002 A1 | 2/2014 | Yokoyama et al. |
| 2014/0065490 A1 | 3/2014 | Otsuka et al. |
| 2014/0154591 A1 | 6/2014 | Yokotsuji et al. |
| 2014/0239963 A1 | 8/2014 | Nakano et al. |
| 2014/0308578 A1 | 10/2014 | Onizuka et al. |
| 2014/0315086 A1* | 10/2014 | Put ............... H01M 4/134 |
| | | 429/218.1 |
| 2014/0322576 A1 | 10/2014 | Okumura et al. |
| 2014/0322579 A1 | 10/2014 | Mitsuhashi et al. |
| 2014/0342245 A1 | 11/2014 | Ito et al. |
| 2015/0044533 A1 | 2/2015 | Tode et al. |
| 2015/0104702 A1 | 4/2015 | Hojo et al. |
| 2015/0125752 A1 | 5/2015 | Nishimura et al. |
| 2015/0140361 A1 | 5/2015 | Abe et al. |
| 2015/0270522 A1 | 9/2015 | Yamada et al. |
| 2015/0372308 A1 | 12/2015 | Sakai et al. |
| 2016/0006029 A1 | 1/2016 | Sugaya et al. |
| 2016/0013516 A1 | 1/2016 | Heishi et al. |
| 2016/0079632 A1 | 3/2016 | Fukunaga et al. |
| 2016/0111752 A1 | 4/2016 | Fukunaga et al. |
| 2016/0156070 A1 | 6/2016 | Minami et al. |
| 2016/0308252 A1 | 10/2016 | Iriyama et al. |
| 2016/0329560 A1 | 11/2016 | Young et al. |
| 2016/0329601 A1 | 11/2016 | Kim et al. |
| 2016/0380303 A1 | 12/2016 | Minami et al. |
| 2017/0040642 A1 | 2/2017 | Ito et al. |
| 2017/0204124 A1 | 7/2017 | Takahashi et al. |
| 2017/0263979 A1 | 9/2017 | Hanazaki |
| 2017/0263989 A1 | 9/2017 | Takechi |
| 2017/0301920 A1 | 10/2017 | Liu et al. |
| 2017/0301947 A1 | 10/2017 | Makino et al. |
| 2017/0346137 A1 | 11/2017 | Chang et al. |
| 2018/0108937 A1 | 4/2018 | Drach et al. |
| 2018/0138465 A1 | 5/2018 | Yang et al. |
| 2018/0183103 A1 | 6/2018 | Kawai |
| 2018/0233780 A1 | 8/2018 | Ishikawa et al. |
| 2018/0366735 A1 | 12/2018 | Liu et al. |
| 2019/0123389 A1 | 4/2019 | Nakagaki et al. |
| 2019/0372125 A1 | 12/2019 | Miyamae et al. |
| 2019/0386338 A1 | 12/2019 | Kawai et al. |
| 2020/0091559 A1 | 3/2020 | Noguchi et al. |
| 2020/0161701 A1 | 5/2020 | Koike |
| 2020/0176839 A1 | 6/2020 | Elia et al. |
| 2020/0321655 A1* | 10/2020 | Vaughey ........... H01M 10/0525 |
| 2020/0335823 A1 | 10/2020 | Takahashi et al. |
| 2021/0043972 A1 | 2/2021 | Sugawara et al. |
| 2021/0090818 A1 | 3/2021 | Aita et al. |
| 2021/0159484 A1 | 5/2021 | Yakushiji et al. |
| 2021/0265654 A1 | 8/2021 | Vereecken et al. |
| 2021/0305583 A1 | 9/2021 | Harada |
| 2021/0313624 A1 | 10/2021 | Morinaka et al. |
| 2022/0158175 A1* | 5/2022 | Zhang ............... H01M 4/483 |
| 2023/0223543 A1* | 7/2023 | Kampmann ........... H01M 4/04 |
| | | 429/232 |
| 2023/0238514 A1* | 7/2023 | Lee ............... C04B 35/62839 |
| | | 429/231.4 |

FOREIGN PATENT DOCUMENTS

| | | |
|---|---|---|
| CN | 112349899 A | 2/2021 |
| EP | 2120279 A1 | 11/2009 |
| EP | 2475041 A1 | 7/2012 |
| EP | 2535976 A1 | 12/2012 |
| EP | 3512024 A1 | 7/2019 |
| EP | 3512025 A1 | 7/2019 |
| JP | S62-100949 A | 5/1987 |
| JP | H01-272051 A | 10/1989 |
| JP | H02-253560 A | 10/1990 |
| JP | H05-101847 A | 4/1993 |
| JP | H05-326018 A | 12/1993 |
| JP | H07-296849 A | 11/1995 |
| JP | H08-037024 A | 2/1996 |
| JP | H08-306387 A | 11/1996 |
| JP | H09-063644 A | 3/1997 |
| JP | H09-115514 A | 5/1997 |
| JP | H10-233345 A | 9/1998 |
| JP | H10-247519 A | 9/1998 |
| JP | H11-026015 A | 1/1999 |
| JP | H11-307120 A | 11/1999 |
| JP | H11-307123 A | 11/1999 |
| JP | 2000-164248 A | 6/2000 |
| JP | 2000-294281 A | 10/2000 |
| JP | 2001-043867 A | 2/2001 |
| JP | 2001-043895 A | 2/2001 |
| JP | 2001-085058 A | 3/2001 |
| JP | 2002-015728 A | 1/2002 |
| JP | 2002-015769 A | 1/2002 |
| JP | 2002-083629 A | 3/2002 |
| JP | 2002-083632 A | 3/2002 |
| JP | 2002-184460 A | 6/2002 |
| JP | 2002-184465 A | 6/2002 |
| JP | 2002-534775 A | 10/2002 |
| JP | 2002-343424 A | 11/2002 |
| JP | 2002-358963 A | 12/2002 |
| JP | 2003-100342 A | 4/2003 |
| JP | 2003-217652 A | 7/2003 |
| JP | 2003-217654 A | 7/2003 |

(56) References Cited

FOREIGN PATENT DOCUMENTS

| | | | |
|---|---|---|---|
| JP | 2003-282055 | A | 10/2003 |
| JP | 2003-297423 | A | 10/2003 |
| JP | 2003-317800 | A | 11/2003 |
| JP | 2003-331917 | A | 11/2003 |
| JP | 2004-055320 | A | 2/2004 |
| JP | 2004-055537 | A | 2/2004 |
| JP | 2004-071159 | A | 3/2004 |
| JP | 2004-087136 | A | 3/2004 |
| JP | 2004-111349 | A | 4/2004 |
| JP | 2004-207210 | A | 7/2004 |
| JP | 2004-281073 | A | 10/2004 |
| JP | 2004-281185 | A | 10/2004 |
| JP | 2004-281218 | A | 10/2004 |
| JP | 2004-355974 | A | 12/2004 |
| JP | 2004-356092 | A | 12/2004 |
| JP | 2004-363016 | A | 12/2004 |
| JP | 2004-363031 | A | 12/2004 |
| JP | 2005-005115 | A | 1/2005 |
| JP | 2005-005117 | A | 1/2005 |
| JP | 2005-032714 | A | 2/2005 |
| JP | 2005-032716 | A | 2/2005 |
| JP | 2005-038722 | A | 2/2005 |
| JP | 2005-100851 | A | 4/2005 |
| JP | 2005-123091 | A | 5/2005 |
| JP | 2005-129481 | A | 5/2005 |
| JP | 2005-519441 | A | 6/2005 |
| JP | 2005-243321 | A | 9/2005 |
| JP | 2005-243490 | A | 9/2005 |
| JP | 2005-285491 | A | 10/2005 |
| JP | 2005-310619 | A | 11/2005 |
| JP | 2005-317499 | A | 11/2005 |
| JP | 2005-347240 | A | 12/2005 |
| JP | 2006-024380 | A | 1/2006 |
| JP | 2006-049037 | A | 2/2006 |
| JP | 2006-261093 | A | 9/2006 |
| JP | 2007-128723 | A | 5/2007 |
| JP | 2007-200605 | A | 8/2007 |
| JP | 2007-200821 | A | 8/2007 |
| JP | 2007-273438 | A | 10/2007 |
| JP | 2007-311217 | A | 11/2007 |
| JP | 2007-534122 | A | 11/2007 |
| JP | 2008-053211 | A | 3/2008 |
| JP | 2008-077915 | A | 4/2008 |
| JP | 2008-108454 | A | 5/2008 |
| JP | 2008-166271 | A | 7/2008 |
| JP | 2008-176987 | A | 7/2008 |
| JP | 2008-192504 | A | 8/2008 |
| JP | 2008-218387 | A | 9/2008 |
| JP | 2008-257988 | A | 10/2008 |
| JP | 2009-503769 | A | 1/2009 |
| JP | 2009-508304 | A | 2/2009 |
| JP | 2009-158460 | A | 7/2009 |
| JP | 2009-176534 | A | 8/2009 |
| JP | 2009-187880 | A | 8/2009 |
| JP | 2009-283463 | A | 12/2009 |
| JP | 2009-302058 | A | 12/2009 |
| JP | 2010-010095 | A | 1/2010 |
| JP | 2010-015717 | A | 1/2010 |
| JP | 2010-123287 | A | 6/2010 |
| JP | 2010-527101 | A | 8/2010 |
| JP | 2010-529608 | A | 8/2010 |
| JP | 2010-529633 | A | 8/2010 |
| JP | 2011-054406 | A | 3/2011 |
| JP | 2011-071098 | A | 4/2011 |
| JP | 2011-119183 | A | 6/2011 |
| JP | 2011-187440 | A | 9/2011 |
| JP | 2011-222431 | A | 11/2011 |
| JP | 2012-134151 | A | 7/2012 |
| JP | 2013-037772 | A | 2/2013 |
| JP | 2013-037864 | A | 2/2013 |
| JP | 2013-089445 | A | 5/2013 |
| JP | 2013-097973 | A | 5/2013 |
| JP | 2013-131293 | A | 7/2013 |
| JP | 2013-243010 | A | 12/2013 |
| JP | 2014-026932 | A | 2/2014 |
| JP | 2014-035897 | A | 2/2014 |
| JP | 2014-035936 | A | 2/2014 |
| JP | 2014-110235 | A | 6/2014 |
| JP | 2014-522077 | A | 8/2014 |
| JP | 2014-225481 | A | 12/2014 |
| JP | 2014-229563 | A | 12/2014 |
| JP | 2015-028875 | A | 2/2015 |
| JP | 2015-069702 | A | 4/2015 |
| JP | 2015-534254 | A | 11/2015 |
| JP | 2016-062738 | A | 4/2016 |
| JP | 2016-066549 | A | 4/2016 |
| JP | 2016-139610 | A | 8/2016 |
| JP | 2016-162627 | A | 9/2016 |
| JP | 2016-184463 | A | 10/2016 |
| JP | 2017-010819 | A | 1/2017 |
| JP | 2017-069164 | A | 4/2017 |
| JP | 2017-147184 | A | 8/2017 |
| JP | 2017-191740 | A | 10/2017 |
| JP | 2017-532740 | A | 11/2017 |
| JP | 2018-014209 | A | 1/2018 |
| JP | 2018-081913 | A | 5/2018 |
| JP | 2018-106950 | A | 7/2018 |
| JP | 2018-113186 | A | 7/2018 |
| JP | 2018-147740 | A | 9/2018 |
| JP | 2018-181758 | A | 11/2018 |
| JP | 2018-190624 | A | 11/2018 |
| JP | 2019-526913 | A | 9/2019 |
| JP | 2019-526914 | A | 9/2019 |
| JP | 2020-071944 | A | 5/2020 |
| WO | 00/41258 | A1 | 7/2000 |
| WO | 02/21631 | A1 | 3/2002 |
| WO | 03/075373 | A2 | 9/2003 |
| WO | 2005/036690 | A1 | 4/2005 |
| WO | 2005/091422 | A1 | 9/2005 |
| WO | 2006/077763 | A1 | 7/2006 |
| WO | 2006/088009 | A1 | 8/2006 |
| WO | 2006/106655 | A1 | 10/2006 |
| WO | 2006/115023 | A1 | 11/2006 |
| WO | 2007/012174 | A1 | 2/2007 |
| WO | 2007/030297 | A2 | 3/2007 |
| WO | 2007/043624 | A1 | 4/2007 |
| WO | 2008/032657 | A1 | 3/2008 |
| WO | 2008/078626 | A1 | 7/2008 |
| WO | 2008/096729 | A1 | 8/2008 |
| WO | 2008/138110 | A1 | 11/2008 |
| WO | 2008/153296 | A1 | 12/2008 |
| WO | 2009/028567 | A1 | 3/2009 |
| WO | 2009/035085 | A1 | 3/2009 |
| WO | 2009/107786 | A1 | 9/2009 |
| WO | 2011/016112 | A1 | 2/2011 |
| WO | 2011/016113 | A1 | 2/2011 |
| WO | 2011/027530 | A1 | 3/2011 |
| WO | 2012/142060 | A2 | 10/2012 |
| WO | 2013/076847 | A1 | 5/2013 |
| WO | 2014/074118 | A1 | 5/2014 |
| WO | 2015/001717 | A1 | 1/2015 |
| WO | 2015/025882 | A1 | 2/2015 |
| WO | 2015/087580 | A1 | 6/2015 |
| WO | 2017/179681 | A1 | 10/2017 |
| WO | 2018/221346 | A1 | 12/2018 |
| WO | 2019/146731 | A1 | 8/2019 |

* cited by examiner

LITHIUM ION SECONDARY BATTERY

BACKGROUND OF THE INVENTION

Field of the Invention

The present invention relates to a lithium ion secondary battery. Priority is claimed on Japanese Patent Application No. 2021-088274 filed on May 26, 2021, the content of which is incorporated herein by reference.

Description of Related Art

Lithium ion secondary batteries are also widely utilized as a power source for mobile devices, such as mobile phones and notebook computers, and for hybrid cars.

The capacities of lithium ion secondary batteries mainly depend on the active material of electrodes. Graphite is generally utilized as a negative electrode active material, but a negative electrode active material with a higher capacity is required. Therefore, attention has been paid to a negative electrode active material containing silicon (Si) which has a much larger theoretical capacity than the theoretical capacity of graphite (372 mAh/g).

Negative electrode active materials containing Si are accompanied by a large volume expansion during charging. When the negative electrode active materials expand in volume, the negative electrode active materials may be damaged in some cases. The volume expansion of the negative electrode active materials is one of the cause of the deterioration of the cycle characteristics of the batteries.

The electrolytic solution is one of the factors that affect the cycle characteristics of a battery. For example, Patent Documents 1 to 3 describe electrolytic solutions containing a specific lithium salt and an ether compound.

PATENT DOCUMENTS

[Patent Document 1] Japanese Unexamined Patent Application. First Publication No. 2009-176534
[Patent Document 2] Japanese Unexamined Patent Application, First Publication No. 2014-110235
[Patent Document 3] Published Japanese Translation No. 2015-534254 of the PCT International Publication

SUMMARY OF THE INVENTION

Further improvement of cycle characteristics is required.

The present disclosure was made in view of the above problems, and an object of the present disclosure is to provide a lithium ion secondary battery having excellent cycle characteristics.

The following means are provided to achieve the above object.

(1) A lithium ion secondary battery according to a first aspect includes a positive electrode, a negative electrode, a separator located between the positive electrode and the negative electrode, and an electrolytic solution. The negative electrode includes a negative electrode active material which contains a material containing silicon and carbon, and a compound containing a first element. The electrolytic solution contains an imide salt which contains the first element and an imide anion. The first element is any one or more elements selected from the group consisting of K, Na, Mg, Ca, Cs, Al, and Zn.

(2) In the lithium ion secondary battery according to the above aspect, when a total amount of silicon and carbon in the material is 100 wt %, a proportion by weight of silicon may be 30 wt % or more and 70 wt % or less and a proportion by weight of carbon may be 30 wt % or more and 70 wt % or less.
(3) In the lithium ion secondary battery according to the above aspect, a molarity proportion of the imide salt containing the first element in the electrolytic solution may be 5% or more and 20% or less with respect to the molarity proportion of the lithium salt in the electrolytic solution.
(4) In the lithium ion secondary battery according to the above aspect, the compound containing the first element may be at least one selected from the group consisting of fluoride oxide, silicide, silicic oxide and phosphorus oxide.
(5) In the lithium ion secondary battery according to the above aspect, the negative electrode active material may include a core and a coating layer with which the core is coated. The coating layer may include a compound containing the first element.
(6) In the lithium ion secondary battery according to the above aspect, a median diameter (D50) of the negative electrode active material may be 1 μm or more and 10 μm or less.

The lithium ion secondary battery according to the above aspect has excellent cycle characteristics.

DETAILED DESCRIPTION OF THE INVENTION

Figure 1:
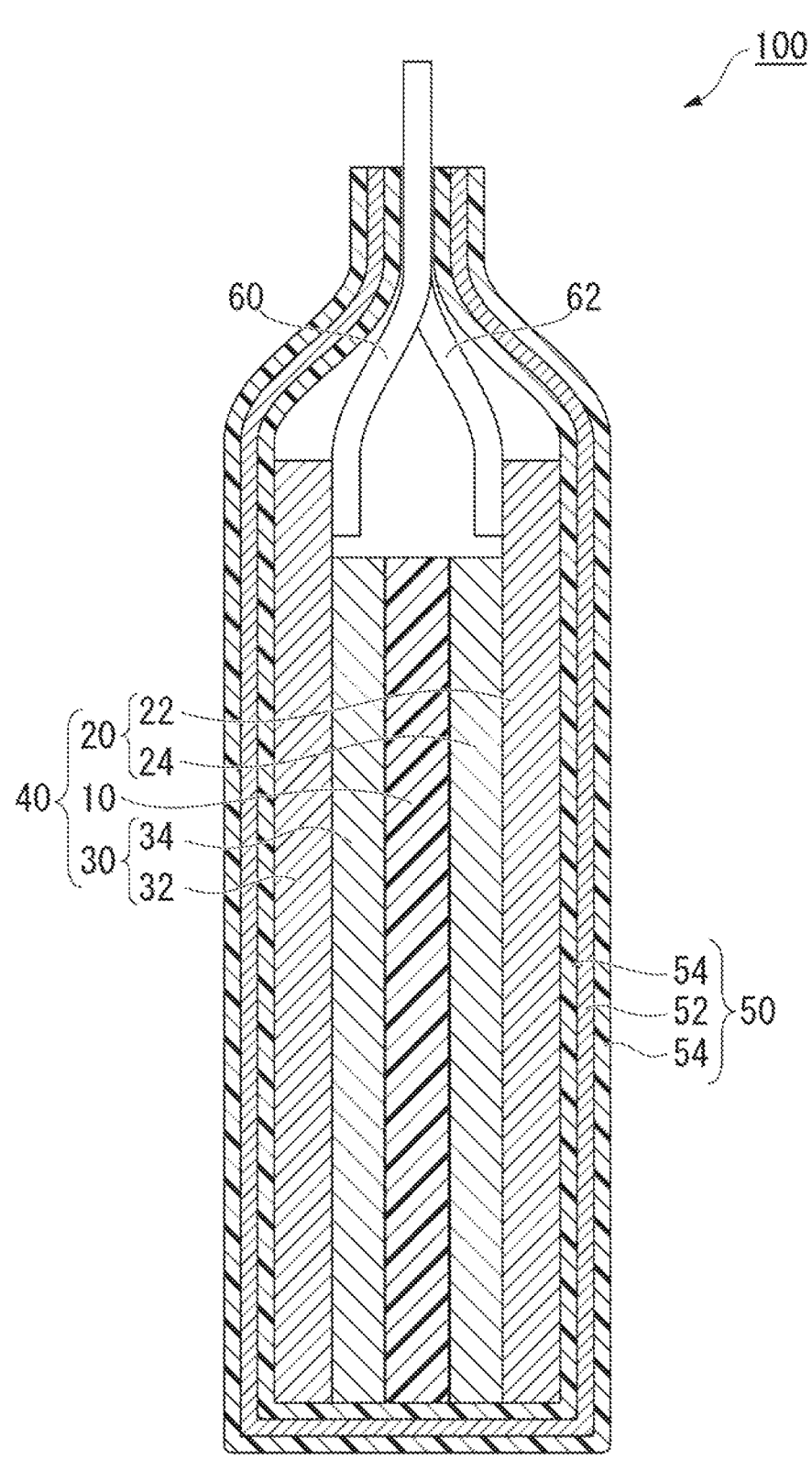
FIG. 1 is a schematic diagram of a lithium ion secondary battery according to a first embodiment.

Embodiments will be described in detail below with reference to the drawings as appropriate. In the drawings used in the following description, an enlarged feature portion may be provided for convenience to make the feature easy to understand, and a dimensional ratio of each constituent element may be different from that of the actual constituent element. The materials, the dimensions, and the like exemplified in the following description are examples, the present invention is not limited thereto, and the present invention can be appropriately modified without changing the gist of the present invention.

"Lithium Ion Secondary Battery"

FIG. 1 is a schematic view of a lithium ion secondary battery according to a first embodiment. A lithium ion secondary battery 100 shown in FIG. 1 includes a power generation element 40, an exterior body 50, and a non-aqueous electrolytic solution (not shown). The periphery of the power generation element 40 is covered with the exterior body 50. The power generation element 40 is connected to the outside through a pair of terminals 60 and 62 which are connected. The non-aqueous electrolytic solution is accommodated in the exterior body 50.

(Power Generation Element)

The power generation element 40 includes a positive electrode 20, a negative electrode 30, and a separator 10.

<Positive Electrode>

The positive electrode 20 includes, for example, a positive electrode current collector 22 and a positive electrode active material layer 24. The positive electrode active material layer 24 is in contact with at least one surface of the positive electrode current collector 22.

[Positive Electrode Current Collector]

The positive electrode current collector 22 is, for example, a conductive sheet material. The positive electrode current collector 22 is, for example, a thin metal sheet made of aluminum, copper, nickel, titanium, stainless steel, or the like. It is preferable that aluminum which has a light weight be utilized for the positive electrode current collector 22. An average thickness of the positive electrode current collector 22 is, for example 10 μm or more and 30 μm or less.

[Positive Electrode Active Material Layer]

The positive electrode active material layer 24 contains, for example, a positive electrode active material. The positive electrode active material layer 24 may contain a conductive auxiliary agent and a binder if necessary.

A basis weight of the positive electrode active material layer 24 is, for example, 15 mg/cm$^2$ or more, and preferably 20 mg/cm$^2$ or more. The basis weight of the positive electrode active material layer 24 is, for example, preferably 35 mg/cm$^2$ or less. The basis weight means the mass of the positive electrode active material layer 24 supported on a surface of the positive electrode current collector 22 per unit area. When the basis weight is large, an amount of the positive electrode active material per unit area increases and the capacity of the battery increases. On the other hand, if the basis weight is too large, it becomes difficult for the electrolytic solution to impregnate into the positive electrode active material layer 24.

The positive electrode active material includes an electrode active material capable of reversibly advancing the occlusion and release of lithium ions, the desorption and insertion (intercalation) of lithium ions, or the doping and dedoping of lithium ions and counter anions.

The positive electrode active material is, for example, a composite metal oxide. Examples of the composite metal oxide include lithium cobaltate (LiCoO$_2$), lithium nickelate (LiNiO$_2$), lithium manganate (LiMnO$_2$), lithium manganese spinel (LiMn$_2$O$_4$), and a compound of the general expression: LiNi$_x$Co$_y$Mn$_x$M$_z$O$_2$ (in the general expression, x+y+z+a=1, 0≤x<1, 0≤y<1, 0≤z<1, and 0≤a<1, and M is one or more elements selected from Al, Mg, Nb, Ti, Cu, Zn, and Cr), a lithium vanadium compound (LiV$_2$O$_5$), olivine type LiMPO$_4$ (where M indicates one or more elements selected from Co, Ni, Mn, Fe, Mg, Nb, Ti, Al, and Zr or VO), lithium titanate (Li$_4$Ti$_5$O$_{12}$), and LiNi$_x$Co$_y$Al$_z$O$_2$ (0.9<x+y+z<1.1). The positive electrode active material may be an organic substance. For example, the positive electrode active material may be polyacetylenes polyaniline, polypyrrole, polythiophene, or polyacene.

The positive electrode active material may be a lithium-free material. The lithium-free material is, for example. FeF$_3$, a conjugated polymer containing an organic conductive substance, a chevrel phase compound a transition metal chalcogenide, a vanadium oxide, a niobium oxide, or the like. As the lithium-free material, only one of these materials may be utilized or a combination of a plurality of materials may be utilized. When the positive electrode active material is a lithium-free material, for example, electric discharge is performed first. Lithium is inserted into the positive electrode active material through electric discharge. In addition, lithium may be chemically or electrochemically pre-doped into a lithium-free material for the positive electrode active material.

Conductive auxiliary agents each enhance electron conductivity between positive electrode active materials. The conductive auxiliary agent is, for example, a carbon powder, a carbon nanotube, a carbon material, a metal fine powder, a mixture of a carbon material and a metal fine powder, or a conductive oxide. The carbon powder is for example, carbon black, acetylene black, ketjen black, and the like. The metal fine powder is, for example, powder of copper, nickel, stainless steel, iron, or the like.

The hinder binds the active material together. As the binder, a known binder can be utilized. The binder is, for example, a fluororesin. Examples of the fluororesin include polyvinylidene fluoride (PVDF), polytetrafluoroethylene (PTFE), a tetrafluoroethylene-hexafluoropropylene copolymer (FFP), a tetrafluoroethylene-perfluoroalkyl vinyl ether copolymer (PFA), ethylene-tetrafluoroethylene copolymer (ETFE), polychlorotrifluoroethylene (PCTFE), ethylene-chlorotrifluoroethylene copolymer (ECTFE), polyvinyl fluoride (PVF), and the like.

In addition to the above, examples of the binder include a vinylidene fluoride fluororubber such as vinylidene fluoride-hexafluoropropylene-based fluororubber (VDF-HFP-based fluororubber), vinylidene fluoride-hexafluoropropylene-tetrafluoroethylene-based fluororubber (VDF-HFP-TPF-basedfluororubber), vinylidenefluoride-pentatluoropropylene-based fluororubber (VDF-PFP-based uororubber), vinylidene fluoride-pentafluoropropylene-tetrafluoroethylene-based fluororubber (VDF-PFP-TFE-based fluororubber), vinylidene fluoride-perfluoromethyl vinyl ether-tetratluoroethylene-based fluororubber (VDF-PFMVE-TFE-based fluororubber), and vinylidene fluoride-chlorotrifluoroethylene-based fluororubber (VDF-CTFE-based fluororubber). Furthermore, the binder may be for example, cellulose, a styrene/butadiene rubber, an ethylene/propylene rubber, a polyimide resin, a polyamide-imide resin, an acrylic resin, or the like.

Also, the binder may be a conductive polymer with electron conductivity or a conductive polymer with ion conductivity. Examples of the conductive polymer with electron conductivity include polyacetylene, polythiophene, polyaniline, and the like. Examples of the conductive polymer with ion conductivity include a composite substance of a polyether-based polymer compound and a lithium salt. Examples of the polyether polymer-based compound include a polyethylene oxide, a polypropylene oxide, and the like. Examples of the lithium salt include LiFSI, LiTFSI, LiBETI, LiClO$_4$, LiBF$_4$, LiPF$_6$, and the like.

A compositional proportion of the positive electrode active material in the positive electrode active material layer 24 is, for example, 80% or more and 98% or less in terms of mass ratio. Furthermore, a compositional proportion of the conductive auxiliary agent in the positive electrode active material layer 24 is, for example, 1.0% or more and 10% or less in terms of mass ratio. In addition, a compositional proportion of the hinder in the positive electrode active material layer 24 is, for example, 1.0% or more and 10% or less in terms of mass ratio.

<Negative Electrode>

The negative electrode 30 includes, for example, a negative electrode current collector 32 and a negative electrode active material layer 34. The negative electrode active material layer 34 is formed on at least one surface of the negative electrode current collector 32.

[Negative Electrode Current Collector]

The negative electrode current collector 32 is, for example, a conductive sheet material. As the negative electrode current collector 32, the same collector as that of the positive electrode current collector 22 can be utilized.

[Negative Electrode Active Material Layer]

The negative electrode active material layer 34 contains a negative electrode active material and a hinder. Furthermore, the negative electrode active material layer 34 may contain a conductive auxiliary agent if necessary. The negative electrode active material includes a material containing silicon and carbon and a compound containing a first element.

The material containing silicon and carbon is, for example, a complex of silicon and carbon. The material containing silicon and carbon may be composed of, for example, only silicon and carbon. The material containing silicon and carbon may be, for example, a compound of silicon and carbon. The compound of silicon and carbon is, for example, silicon carbide. In the material, silicon and carbon may be present in a single state, may be present in a combined state (for example, silicon carbide), or may be a mixture of a simple substance and a compound. The negative electrode active material is, for example, amorphous. If the negative electrode active material is amorphous, desorption of silicon fine particles is unlikely to occur during charging and discharging.

In the material containing silicon and carbon, a proportion by weight of silicon is, for example, 30 wt % or more and 70 wt % or less, preferably 50 wt % or more and 70 wt % or less. In the material containing silicon and carbon, a proportion by weight of carbon is, for example, a difference obtained by subtracting the proportion by weight of silicon from the whole. In the material containing silicon and carbon, the proportion by weight of carbon is, for example, 30 wt % or more and 70 wt % or less, preferably 30 wt % or more and 50 wt % or less. That is to say, when the total amount of silicon and carbon is 100% in the material containing silicon and carbon, the proportion by weight of silicon is, for example, 30 wt % or more and 70 wt % or less and the proportion by weight of carbon is, for example, 30 wt % or more and 70 wt % or less.

If the proportion by weight of silicon is 30 wt % or more, a discharge specific capacity of the negative electrode active material can be increased to 1000 mAh/g or more. Furthermore, when the proportion by weight of silicon is 70 wt % or less, it is possible to prevent the formation of a large number of pores in the negative electrode active material due to volume expansion. Pores in the negative electrode active material inhibit the conduction of electrons and ions and can cause deterioration of the cycle characteristics of the lithium ion secondary battery.

The compound containing the first element is, for example, one or more selected from the group consisting of fluoride, oxide, silicide, and silicic oxide. The first element is any one or more elements selected from the group consisting of K, Na, Mg, Ca, Cs, Al, and Zn. The first element is not limited to one type of element and may be of a plurality of types of element groups. For example, when the first element is Mg, the compounds containing the first element are, for example, $MgF_2$, $MgO$, $Mg_2Si$, $Li_xMg_ySi$, and $Mg_2SiO_4$.

Figure 2:
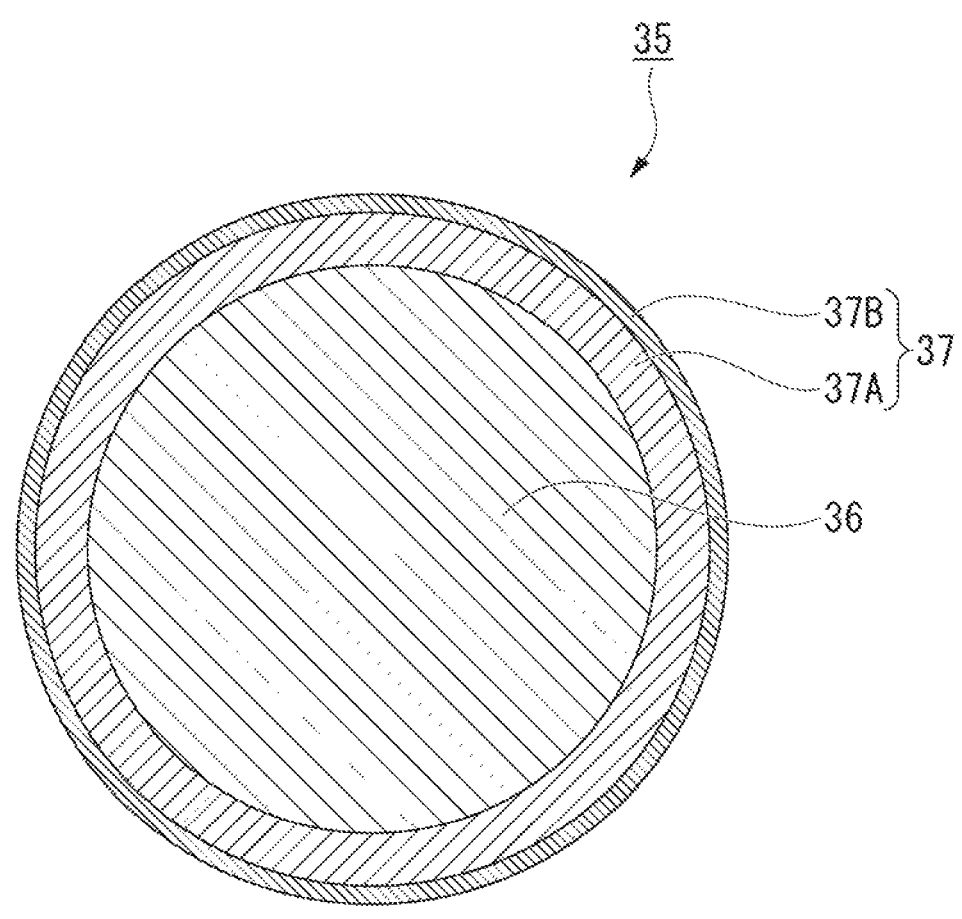
FIG. 2 is a schematic diagram of a negative electrode active material according to the first embodiment.

FIG. 2 is a schematic diagram of a negative electrode active material 35 according to the first embodiment. The negative electrode active material 35 may include a core 36 and a coating layer 37. At least a part of the core 36 is covered with the coating layer 37. The entire surface of the core 36 may be covered with the coating layer 37. The coating layer 37 makes an insertion/desorption reaction of Li uniform and minimizes deterioration of the negative electrode active material 35.

The core 36 includes a material containing silicon and carbon The core 36 is, for example, a complex of silicon and carbon. The coating layer 37 includes, for example, a material containing silicon and carbon, and a compound containing a first element. The coating layer 37 may contain a carbon material, a metal fine powder, a mixture of a carbon material and a metal fine powder, a conductive oxide, an inorganic compound, and the like. The carbon material is, for example, a carbon powder, a carbon nanotuhe, or the like. The metal fine powder is, for example, copper, cobalt, iron, or the like. The inorganic material is, for example, ceramics, oxides, carbides, nitrides, borides, and the like.

The coating layer 37 may include a first layer 37A and a second layer 37B. The second layer 37B is the outermost surface layer of the coating layer 37. The second layer 37B may contain a reaction product of the first element and the material contained in the electrolytic solution. For example, when the first element is Mg, the reaction product of the first element and the material contained in the electrolytic solution is, for example, $Mg_3(PO_4)_2$.

A median diameter (D50) of the negative electrode active material is, for example, 1 μm or more and 10 μm or less. When the particle size of the negative electrode active material decreases, a specific surface area of the negative electrode active material increases. When the specific surface area of the negative electrode active material increases, a frequency of contact between the electrolytic solution and the negative electrode active material increases and the electrolytic solution is easily decomposed. On the other hand, when the particle size of the negative electrode active material increases, local low potential or high potential locations are less likely to occur on the surface of the negative electrode active material. Non-uniformity of the potential can cause redox decomposition of the electrolytic solution. When a median diameter of the negative electrode active material is within the above range, the cycle characteristics of the lithium ion secondary battery 100 are improved.

The discharge specific capacity of the negative electrode active material is, for example, 1000 mAh/g or more and 2500 mAh/g or less. The discharge specific capacity of the negative electrode active material can be adjusted by changing a thickness of the positive electrode active material layer 24 of the positive electrode 20. When the discharge specific capacity of the negative electrode active material increases, the negative electrode has a low potential. In addition, when the discharge specific capacity of the negative electrode active material decreases, the negative electrode has a high potential. A high or low potential of the negative electrode can cause deterioration of cycle characteristics. Even if an amount of lithium which can be trapped increases when the negative electrode potential is high, the electrolytic solution and the coating layer 37 are easily oxidatively decomposed. Even if the expansion and contraction of the negative electrode active material 35 can be prevented when the negative electrode potential is low, the electrolytic solution and the coating layer 37 are easily reduced and decomposed. When a discharge specific capacity of the negative electrode active material is within the above range, the capacity is high and the cycle characteristics are excellent.

The conductive auxiliary agent enhances electronic conductivity between the negative electrode active materials. As the conductive auxiliary agent, the same material as that of the positive electrode 20 can be utilized.

The binder binds the negative electrode active materials together and also binds the negative electrode active material and the negative electrode current collector 32. As the binder, the same binder as that used for the positive electrode 20 can be utilized.

The contents of the negative electrode active material, the conductive auxiliary agent, and the binder in the negative electrode active material layer 34 are not particularly limited. The compositional proportion of the negative electrode active material in the negative electrode active material layer 34 is, for example, 70% or more and 100% or less in terms of mass ratio. Furthermore, the compositional proportion of the conductive auxiliary agent in the negative electrode active material layer 34 is, for example, 0% or more and 10% or less in terms of mass ratio. The compositional proportion of the binder in the negative electrode active material layer 34 is, for example, 0% or more and 20% or less in terms of mass ratio.

<Separator>

The separator 10 is disposed between the positive electrode 20 and the negative electrode 30. The separator 10 isolates the positive electrode 20 and the negative electrode 30 and prevents a short circuit between the positive electrode 20 and the negative electrode 30. The separator 10 extends in a plane along the positive electrode 20 and the negative electrode 30. Lithium ions can pass through the separator 10.

The separator 10 has, for example, an electrically insulating porous structure. The separator 10 is, for example, a monolayer or a laminated body formed of a polyolefin film. The separator 10 may be a stretching film made of a mixture of polyethylene, polypropylene, or the like. The separator 10 may be a fibrous nonwoven fabric made of at least one constituent material selected from the group consisting of cellulose, polyester, polyacrylonitrile, polyamide, polyethylene, and polypropylene. The separator 10 may be, for example, a solid electrolyte. The solid electrolyte is, for example, a polymer solid electrolyte, an oxide-based solid electrolyte, or a sulfide-based solid electrolyte. The separator 10 may be an inorganic coated separator. The inorganic coated separator is obtained by coating a surface of the above film with a mixture of a resin such as PVDF or CMC and an inorganic substance such as alumina or silica. The inorganic coated separator has excellent heat resistance and minimizes the precipitation of transition metals eluted from the positive electrode on a surface of the negative electrode.

<Electrolytic Solution>

The electrolytic solution is sealed in the exterior body 50 and impregnated into the power generation element 40. The non-aqueous electrolytic solution has, for example, a non-aqueous solvent and an electrolyte. The electrolyte is dissolved in a non-aqueous solvent. The electrolytic solution contains, for example, a solvent, an electrolyte, and an imide salt. The imide salt may be of one kind or two or more kinds.

The solvent is not particularly limited as long as it is a solvent generally used for lithium ion secondary batteries. The solvent includes, for example, any of a cyclic carbonate compound, a chain carbonate compound, a cyclic ester compound, and a chain ester compound. The solvent may contain a mixture of these in any proportions. The cyclic carbonate compound is, for example, ethylene carbonate (EC), propylene carbonate (PC), or the like. The chain carbonate compound is, for example, diethyl carbonate (DEC), ethyl methyl carbonate (EMC), or the like. The cyclic ester compound is, for example, $\gamma$-butyrolactone or the like. The chain ester compound is, for example, propyl propionate, ethyl propionate, ethyl acetate, or the like.

The solvent may include a fluorinated organic solvent. The fluorinated organic solvent forms a good coating film on a surface of the negative electrode active material. When a decomposition product of the fluorinated organic solvent and the first element contained in the electrolytic solution are contained in the coating film, Li ions are easily transported in the coating film. As a result, an increase in the resistance of the lithium ion secondary battery 100 is minimized.

The electrolyte is, for example, a lithium salt. Examples of the electrolyte include $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, LiBOB, and the like. One type of lithium salt may be used alone or a combination of two or more types of lithium salts may be used. From the viewpoint of a degree of ionization, it is preferable that the electrolyte contain $LiPF_6$.

The imide salt contains a first element and an imide anion. The first element is as described above. The first element contained in the electrolytic solution and the first element contained in the negative electrode active material layer 34 are, for example, the same element. The first element contained in the electrolytic solution and the first element contained in the negative electrode active material layer 34 may be different elements. The imide salt is not limited to one type and a plurality of types may be contained in the electrolytic solution.

Examples of the imide anion include $(SO_2F)_2N^-$ (FSI$^-$: bis(fluorosulfonyl)imide anion), $(SO_2CF_3)_2N^-$ (TFSI$^-$: bis(trifluoromethanesulfonyl)imide anion), $(SO_2C_2F_5)_2N^-$ (BETI$^-$: bis(pentafluoroethanesulfonyl)imide anion), $(SO_2F)(SO_2CF_3)N^-$, and $(SO_2CF_3)(SO_2C_2F_5)N^-$. One type of imide anion may be used alone or a combination of two or more types of imide anions may be used.

A molarity proportion of the imide salt containing the first element in the electrolytic solution is, for example, 5% or more and 20% or less with respect to a molarity proportion of the lithium salt in the electrolytic solution. If a sufficient imide salt of the first element is contained in the electrolytic solution, decomposition of the electrolytic solution is prevented during charging and discharging of the lithium ion secondary battery 100. Furthermore, if an excessive imide salt of the first element is contained in the electrolytic solution, the viscosity of the electrolytic solution increases and the ability of the electrolytic solution to become impregnated into the positive electrode 20 and the negative electrode 30 decreases.

The molarity proportion of the first element and lithium in the electrolytic solution can be measured through, for example, gas chromatography, inductively coupled plasma (ICP) emission spectrometry, ICP mass analysis, and the like.

<Exterior Body>

The exterior body 50 seals the power generation element 40 and the non-aqueous electrolytic solution therein. The exterior body 50 prevents leakage of the non-aqueous electrolytic solution to the outside and introduction of water and the like into the inside of the lithium ion secondary battery 100 from the outside.

The exterior body 50 has, for example, as shown in FIG. 1, a metal foil 52 and a resin layer 54 laminated on each surface of the metal foil 52. The exterior body 50 is a metal laminate film obtained by coating the metal foil 52 with a polymer film (resin layer 54) from both sides.

As the metal foil 52, for example, an aluminum foil can be used. A polymer film such as polypropylene can be used for the resin layer 54. A material constituting the resin layer 54 may be different between the inside and the outside. For example, a polymer having a high melting point, for example, polyethylene terephthalate (PET), polyamide (PA), or the like can be used as an outer material and polyethylene (PE), polypropylene (PP), or the like can be used as a material of an inner polymer film.

<Terminal>

The terminals 60 and 62 are connected to the positive electrode 20 and the negative electrode 30, respectively. The terminal 60 connected to the positive electrode 20 is a positive electrode terminal and the terminal 62 connected to the negative electrode 30 is a negative electrode terminal. The terminals 60 and 62 are responsible for electrical connection with the outside. The terminals 60 and 62 are formed of a conductive material such as aluminum, nickel, and copper. A connection method may be welding or screwing. It is preferable to protect the terminals 60 and 62 with an insulating tape to prevent a short circuit.

"Method for Producing Lithium Ion Secondary Battery"

The lithium ion secondary battery 100 is prepared by preparing the negative electrode 30, the positive electrode 20, the separator 10, the electrolytic solution, and the exterior body 50 and assembling them. An example of a method for producing the lithium ion secondary battery 100 will be described below.

The negative electrode 30 is prepared through, for example, a compounding step, a slurry manufacturing step, an electrode coating step, a drying step, and a rolling step in this order.

The compounding step is a step of mixing a material containing silicon and carbon and a compound containing the first element while applying a shearing force. Materials containing silicon and carbon need to be prepared in advance. For example, a composite of silicon and carbon is prepared by mixing silicon and carbon while applying a shearing force. Furthermore, for example, a compound of silicon and carbon is prepared by causing silicon and carbon to react.

If a material containing silicon and carbon and a compound containing the first element are mixed while applying a shearing force, the surface of the negative electrode active material is coated with the compound containing the first element. Furthermore, the particle size of the negative electrode active material can be adjusted by the degree of mixing. In addition, the prepared negative electrode active material may be sieved to make the particle size uniform.

The slurry manufacturing step is a step of mixing the combined negative electrode active material, the binder, and the solvent as a compound to prepare a slurry. In the slurry manufacturing step, a conductive auxiliary agent may be added if necessary. The solvent is, for example, water, N-methyl-2-pyrrolidone, and the like. The compositional proportions of the negative electrode active material, the conductive material, and the hinder is preferably 70 wt % to 100 wt %:0 wt % to 10 wt %:0 wt % to 20 wt % in terms of mass ratio. These mass ratios are adjusted to be 100 wt % as a whole.

The electrode coating step is a step of coating a surface of the negative electrode current collector 32 with the slurry. A slurry coating method is not particularly limited. For example, a slit die coat method and a doctor blade method can be utilized as the slurry coating method.

The drying, step is a step of removing the solvent from the slurry. For example, the negative electrode current collector 32 coated with the slurry is dried in an atmosphere of 80° C. to 150° C. When the slurry dries, the negative electrode active material layer 34 is formed on the negative electrode current collector 32.

The rolling step is performed if necessary. The rolling step is a step of applying pressure to the negative electrode active material layer 34 to adjust a density of the negative electrode active material layer 34. The rolling step is performed using, for example, a roll press device or the like.

The positive electrode 20 can be prepared by the same procedure as that of the negative electrode 30 except that the compounding step is not performed. As the separator 10 and the exterior body 50, commercially available separator and exterior body can be utilized.

The electrolytic solution can be prepared, for example, by adding the imide salt containing the first element and the imide anion to the mixture of the lithium salt and the solvent and mixing them.

Subsequently, the power generation element 40 is prepared by laminating the separator 10 and the prepared positive electrode 20 and negative electrode 30 so that the separator 10 is located between the prepared positive electrode 20 and negative electrode 30. When the power generation element 40 is a wound body, the positive electrode 20, the negative electrode 30, and the separator 10 are wound using one end side of the positive electrode 20, the negative electrode 30, and the separator 10 as an axis.

Finally, the power generation element 40 is sealed in the exterior body 50. The non-aqueous electrolytic solution is injected into the exterior body 50. The non-aqueous electrolytic solution is impregnated into the power generation element 40 by injecting the non-aqueous electrolytic solution and then reducing the pressure, the heating, or the like. When the exterior body 50 is sealed by applying heat or the like, the lithium ion secondary battery 100 can be obtained. The power generation element 40 may be impregnated into the electrolytic solution instead of injecting the electrolytic solution into the exterior body 50.

The lithium ion secondary battery 100 according to the first embodiment has excellent cycle characteristics. The reason for this will be described below.

When the negative electrode active material expands in volume, silicon fine particles may be desorbed from the negative electrode active material in some cases. These silicon fine particles cause high viscosity of the electrolytic solution and clogging of the separator 10. If the electrolytic solution becomes highly viscous, it becomes difficult for the electrolytic solution to impregnate the negative electrode active material layer 34. Increasing the viscosity of the electrolytic solution causes the cycle characteristics of the lithium ion secondary battery to deteriorate. Furthermore, if the separator 10 is clogged, the movement of Li ions is hindered. The clogging of the separator 10 causes deterioration of the cycle characteristics of the lithium ion secondary battery.

In the lithium ion secondary battery 100 according to the first embodiment, the compound containing the first element is present in the negative electrode active material. The compound containing the first element reacts with the desorbed silicon fine particles and takes in the silicon fine particles. For this reason, the lithium ion secondary battery 100 according to the first embodiment can prevent the silicon fine particles from flowing out into the electrolytic solution and the deterioration of the cycle characteristics is prevented.

Also, in the lithium ion secondary battery 100 according to the first embodiment, the inside salt containing the first element is present in the electrolytic solution. For this reason, even when the first element in the negative electrode active material is depleted due to the reaction between the silicon fine particles and the compound containing the first element, the first element can be supplied from the electrolytic solution to the negative electrode active material. Therefore, the lithium ion secondary battery 100 can maintain a high capacity retention rate even when the number of cycles is increased.

Furthermore, when the silicon fine particles flow out into the electrolytic solution, they pass near the surface of the negative electrode active material. For this reason, if the first element is contained in the coating layer 37 of the negative electrode active material, the effect of preventing the deterioration of the cycle characteristics of the lithium ion secondary battery 100 is high.

Although the embodiments of the present invention have been described in detail above with reference to the drawings, each constitution and a combination thereof in each embodiment are examples and the constitutions can be added, omitted, replaced, and other changes are possible without departing from the gist of the present invention.

EXAMPLES

Example 1

One surface of an aluminum foil having a thickness of 15 μm was coated with a positive electrode slurry. The positive electrode slurry was prepared by mixing a positive electrode active material, a conductive auxiliary agent, a binder, and a solvent.

$Li_xCoO_2$ was used as the positive electrode active material. Acetylene black was used as the conductive auxiliary agent. Polyvinylidene fluoride (PVDF) was used as the binder. N-methyl-2-pyrrolidone was used as the solvent. The positive electrode slurry was prepared by mixing 97 parts by mass of the positive electrode active material. 1 part by mass of the conductive auxiliary agent, 2 parts by mass of the binder, and 70 parts by mass of the solvent. An amount of a positive electrode active material supported on a dried positive electrode active material layer was 25 mg/cm². The solvent was removed from the positive electrode slurry in a drying furnace to prepare a positive electrode active material layer. A positive electrode was prepared by pressing the positive electrode active material layer through a roll press.

A material containing silicon and carbon was prepared by combining silicon and carbon as a compound using Mechanofusion manufactured by Hosokawa Micron tilted at 10 degrees. In the material containing silicon and carbon, a proportion by weight of silicon was 60 wt % and a proportion by weight of carbon was 40 wt %. Subsequently, a negative electrode active material was prepared by combining a material containing silicon and carbon with magnesium oxide and LiF as a compound using the same device as described above. A rotation speed of the device at the time of compounding was set to 2500 rpm. Magnesium oxide is an oxide containing the first element. A median diameter of the negative electrode active material which has been subjected to a composite treatment was 5 μm. A coating layer containing Mg was formed on a surface of the negative electrode active material.

Subsequently, one surface of a copper foil having a thickness of 10 μm was coated with a negative electrode slurry. A negative electrode slurry was prepared by mixing a negative electrode active material, a conductive auxiliary agent, a binder, and a solvent. A negative electrode active material had been subjected to the above compounding treatment. Carbon black was used as the conductive auxiliary agent. A polyimide resin was used as the binder. N-methyl-2-pyrrolidone was used as the solvent. A negative electrode slurry was prepared by mixing 90 parts by mass of the negative electrode active material, 5 parts by mass of the conductive auxiliary agent, and 5 parts by mass of the binder with N-methyl-2-pyrrolidone. An amount of a negative electrode active material supported on a dried negative electrode active material layer was 3.0 mg/cm². A negative electrode active material layer was prepared by removing the solvent from a negative electrode slurry in a drying furnace. The negative electrode active material layer was pressed through a roll press and then heat-fired at 300° C. or higher for 5 hours in a nitrogen atmosphere.

Subsequently, the solvent was prepared by mixing fluoroethylene carbonate (FEC), ethylene carbonate (EC), propylene carbonate (PC), and diethyl carbonate (DEC) so that a volume ratio was fluoroethylene carbonate (FEC):ethylene carbonate (EC):propylene carbonate (PC):diethyl carbonate (DEC)=5:5:20:70. $LiPF_6$ was dissolved in this mixed solvent to have a concentration of 1 mol/L. After that, with respect to this solution, the electrolytic solution was prepared by adding $Mg(TESI)_2$ as an imide salt to the electrolytic solution. The imide salt concentration of the first element with respect to the Li salt concentration was adjusted to be 10% (0.1 mol/L).

(Preparation of Lithium Ion Secondary Battery for Evaluation)

A laminated body was obtained by laminating the prepared negative electrode and positive electrode via the separator (porous polyethylene sheet) so that the positive electrode active material layer and the negative electrode active material layer faced each other. A nickel negative electrode lead was attached to a negative electrode of the laminated body. An aluminum positive electrode lead was attached to a positive electrode of the laminated body. The positive electrode lead and the negative electrode lead were welded through an ultrasonic welder. This laminated body was inserted into the exterior body formed of an aluminum laminated film and heat-sealed except for one peripheral portion to form a closed portion. Furthermore, finally, after injecting the electrolytic solution into the exterior body, the remaining one place was sealed with a heat seal while reducing the pressure with a vacuum sealer to prepare a lithium ion secondary battery. Two lithium ion secondary batteries such as one lithium ion secondary battery for electrolytic solution composition analysis and the other lithium ion secondary battery for charge/discharge characteristic evaluation were prepared.

The electrolytic solution was collected from the lithium ion secondary battery for analyzing an electrolytic solution composition. Subsequently, a composition of the collected electrolytic solution was analyzed using ICP emission. As a result, it was confirmed that the content of Mg in the electrolytic solution was the same as the content at the time of preparing the electrolytic solution.

(Measurement of Capacity Retention after 300 Cycles)

The cycle characteristics of the lithium-ion secondary battery for evaluation were measured. The cycle characteristics were measured using a secondary battery charge/discharge test device (manufactured by Hokuto Denko Corporation).

Charge was performed until the battery voltage reached 4.4 V with constant current charging at a charging rate of 1.0 C (current value in which charging is completed in 1 hour when constant current charging is performed at 25° C.). In addition, Discharge was performed with a constant current discharge at a discharge rate of 1.0 C until the battery voltage reached 3.0 V. The discharge capacity after the end of charging and discharging was detected and a battery capacity $Q_1$ before the cycle test was obtained.

The battery for which the battery capacity $Q_1$ was obtained above was charged through constant current charging at a charge rate of 1.0 C until the battery voltage reached 4.4 V and discharged through constant current discharging at a discharge rate of 1.0 C until the battery voltage reached 3.0 V using a secondary battery charge/discharge test device again. The charge/discharge was counted as one cycle and 300 cycles of charge/discharge were performed. After that, the discharge capacity after the end of 300 cycles of charging and discharging was detected and a battery capacity $Q_2$ after 300 cycles was obtained.

Based on the capacities $Q_1$ and $Q_2$ obtained above, a capacity retention rate E after 300 cycles was determined. The capacity retention rate E was obtained by $E=Q_2/Q_1 \times 100$. The capacity retention rate E of Example 1 was 77%.

Examples 2 to 8

Examples 2 to 8 were different from Example 1 in that a mixing ratio of silicon and carbon is changed at the time of preparing a material containing silicon and carbon. That is to say, Examples 2 to 8 were different from Example 1 in that a proportion by weight of silicon and carbon in a negative electrode active material was different. As for other conditions, a capacity retention rate E was obtained in the same manner as in Example 1. The results are summarized in Table 1.

Examples 9 to 16

Examples 9 to 16 were different from Example 1 in that at least one of an imide salt added to an electrolytic solution and a first element contained in a negative electrode active material was changed. As for other conditions, a capacity retention rate E was determined in the same manner as in Example 1. The results are summarized in Table 1.

Examples 17 to 21

Examples 17 to 21 were different from Example 1 in that a Li salt concentration and an imide salt concentration of a first element in an electrolytic solution were changed. In each of Examples 17 to 21, the imide salt concentration of the first element was adjusted to 10% with respect to the Li salt concentration in the electrolytic solution. As for other conditions, a capacity retention rate E was determined in the same manner as in Example 1. The results are summarized in Table 1.

Examples 22 to 25

Examples 22 to 25 were different from Example 1 in that a Li salt concentration in an electrolytic solution was fixed and an imide salt concentration of a first element was changed. As for other conditions, a capacity retention rate F was determined in the same manner as in Example 1. The results are summarized in Table 2.

Examples 26 to 29

Examples 26 to 29 were different from Example 1 in that an imide salt added to an electrolytic solution and a first element contained in a negative electrode active material were changed. In Examples 26 to 29, two or more kinds of first elements contained in the imide salt and the first element contained in the negative electrode active material were used. As for other conditions, a capacity retention rate E was determined in the same manner as in Example 1. The results are summarized in Table 2.

Examples 30 to 34

Examples 30 to 34 were different from Example 1 in that a particle size of a negative electrode active material was changed. As for other conditions, a capacity retention rate E was determined in the same manner as in Example 1. The results are summarized in Table 2.

Comparative Example 1

Comparative Example 1 was different from Example 1 in that magnesium oxide (compound containing first element) was not added when a negative electrode active material was prepared and an imide salt was not added to an electrolytic solution. As for other conditions, a capacity retention rate E was determined in the same manner as in Example 1. The results are summarized in Table 2.

Comparative Example 2

Comparative Example 2 was different from Example 1 in that an imide salt was not added to an electrolytic solution. As for other conditions, a capacity retention rate E was determined in the same manner as in Example 1. The results are summarized in Table 2.

Comparative Example 3

Comparative Example 3 was different from Example 1 in that magnesium oxide (compound containing first element) was not added when a negative electrode active material was prepared. As for other conditions, a capacity retention rate E was determined in the same manner as in Example 1. The results are summarized in Table 2.

In Examples 1 to 34, all of the capacity retention rates were higher than that in Comparative Examples 1 to 3. That is to say, the lithium ion secondary batteries according to Examples 1 to 34 in which the negative electrode active material contains the compound containing the first element and the electrolytic solution contains the imide salt of the first element are excellent in cycle characteristics.

TABLE 1

| | Negative electrode active material | | | | | Electrolytic solution | | Imide salt concentration/ | Cycle characteristics |
| | Core material | Proportion of weight of Si (wt %) | Particle size (μm) | First element | Imide salt | Li salt concentration (mol/L) | Imide salt concentration (mol/L) | Li salt concentration (%) | Capacity retention rate E (%) |
|---|---|---|---|---|---|---|---|---|---|
| Example 1 | SiC | 60 | 5 | Mg | Mg(TFSI)$_2$ | 1.0 | 0.1 | 10 | 77 |
| Example 2 | SiC | 20 | 5 | Mg | Mg(TFSI)$_2$ | 1.0 | 0.1 | 10 | 67 |
| Example 3 | SiC | 28 | 5 | Mg | Mg(TFSI)$_2$ | 1.0 | 0.1 | 10 | 68 |
| Example 4 | SiC | 34 | 5 | Mg | Mg(TFSI)$_2$ | 1.0 | 0.1 | 10 | 75 |
| Example 5 | SiC | 50 | 5 | Mg | Mg(TFSI)$_2$ | 1.0 | 0.1 | 10 | 77 |
| Example 6 | SiC | 67 | 5 | Mg | Mg(TFSI)$_2$ | 1.0 | 0.1 | 10 | 77 |
| Example 7 | SiC | 73 | 5 | Mg | Mg(TFSI)$_2$ | 1.0 | 0.1 | 10 | 69 |
| Example 8 | SiC | 80 | 5 | Mg | Mg(TFSI)$_2$ | 1.0 | 0.1 | 10 | 64 |
| Example 9 | SiC | 60 | 5 | Mg | Mg(FSI)$_2$ | 1.0 | 0.1 | 10 | 76 |
| Example 10 | SiC | 60 | 5 | Mg | Mg(BETI)$_2$ | 1.0 | 0.1 | 10 | 74 |
| Example 11 | SiC | 60 | 5 | Ca | Ca(TFSI)$_2$ | 1.0 | 0.1 | 10 | 71 |
| Example 12 | SiC | 60 | 5 | Cs | Cs(TFSI)$_2$ | 1.0 | 0.1 | 10 | 72 |
| Example 13 | SiC | 60 | 5 | Al | Al(TFSI)$_3$ | 1.0 | 0.1 | 10 | 73 |
| Example 14 | SiC | 60 | 5 | Zn | Zn(TFSI)$_2$ | 1.0 | 0.1 | 10 | 72 |
| Example 15 | SiC | 60 | 5 | Na | NaFSI | 1.0 | 0.1 | 10 | 67 |
| Example 16 | SiC | 60 | 5 | K | KFSI | 1.0 | 0.1 | 10 | 69 |
| Example 17 | SiC | 60 | 5 | Mg | Mg(TFSI)$_2$ | 0.5 | 0.05 | 10 | 72 |
| Example 18 | SiC | 60 | 5 | Mg | Mg(TFSI)$_2$ | 1.1 | 0.11 | 10 | 76 |
| Example 19 | SiC | 60 | 5 | Mg | Mg(TFSI)$_2$ | 2.0 | 0.20 | 10 | 74 |
| Example 20 | SiC | 60 | 5 | Mg | Mg(TFSI)$_2$ | 3.8 | 0.38 | 10 | 77 |
| Example 21 | SiC | 60 | 5 | Mg | Mg(TFSI)$_2$ | 4.5 | 0.45 | 10 | 79 |

TABLE 2

| | Negative electrode active material | | | | | Electrolytic solution | | Imide salt concentration/ | Cycle characteristics |
| | Core material | Proportion by weight of Si (wt %) | Particle size (μm) | First element | Imide salt | Li salt concentration (mol/L) | Imide salt concentration (mol/L) | Li salt concentration (%) | Capacity retention rate E (%) |
|---|---|---|---|---|---|---|---|---|---|
| Example 22 | SiC | 60 | 5 | Mg | Mg(TESI)$_2$ | 1.0 | 0.06 | 6 | 71 |
| Example 23 | SiC | 60 | 5 | Mg | Mg(TFSI)$_2$ | 1.0 | 0.18 | 18 | 76 |
| Example 24 | SiC | 60 | 5 | Mg | Mg(TFSI)$_2$ | 1.0 | 0.24 | 24 | 66 |
| Example 25 | SiC | 60 | 5 | Mg | Mg(TFSI)$_2$ | 1.0 | 0.30 | 30 | 62 |
| Example 26 | SiC | 60 | 5 | Mg Ca | Mg(TFSI)$_2$ Ca(TFSI)$_2$ | 1.0 | 0.1 | 10 | 78 |
| Example 27 | SiC | 60 | 5 | Mg Al | Mg(TFSI)$_2$ Al(TFSI)$_3$ | 1.0 | 0.1 | 10 | 80 |
| Example 28 | SiC | 60 | 5 | Mg Zn | Mg(TFSI)$_2$ Zn(TFSI)$_2$ | 1.0 | 0.1 | 10 | 80 |
| Example 29 | SiC | 60 | 5 | Mg Ca Al | Mg(TFSI)$_2$ Ca(TFSI)$_2$ Al(TFSI)$_3$ | 1.0 | 0.1 | 10 | 81 |
| Example 30 | SiC | 60 | 0.8 | Mg | Mg(TFSI)$_2$ | 1.0 | 0.1 | 10 | 62 |
| Example 31 | SiC | 60 | 1.2 | Mg | Mg(TFSI)$_2$ | 1.0 | 0.1 | 10 | 73 |
| Example 32 | SiC | 60 | 4.6 | Mg | Mg(TFSI)$_2$ | 1.0 | 0.1 | 10 | 76 |
| Example 33 | SiC | 60 | 8 | Mg | Mg(TFSI)$_2$ | 1.0 | 0.1 | 10 | 75 |
| Example 34 | SiC | 60 | 12 | Mg | Mg(TFSI)$_2$ | 1.0 | 0.1 | 10 | 66 |
| Comparative Example 1 | SiC | 60 | 5 | — | — | 1.0 | — | — | 50 |
| Comparative Example 2 | SiC | 60 | 5 | Mg | — | 1.0 | — | — | 57 |
| Comparative Example 3 | SiC | 60 | 5 | — | Mg(TFSI)$_2$ | 1.0 | 0.1 | 10 | 60 |

60

EXPLANATION OF REFERENCES

10 Separator
20 Positive electrode
22 Positive electrode current collector
24 The positive electrode active material layer
30 Negative electrode

32 Negative electrode current collector
34 Negative electrode active material layer
35 Negative electrode active material
36 Core
37 Coating layer
37A First layer
37B Second layer

65

40 Power generation element
50 Exterior body
52 Metal foil
54 Resin layer
60, 62 Terminal
100 Lithium ion secondary battery

What is claimed is:

1. A lithium ion secondary battery comprising:

a positive electrode;

a negative electrode;

a separator located between the positive electrode and the negative electrode; and an electrolytic solution, wherein the negative electrode includes a negative electrode active material which contains a material containing silicon and carbon, and a compound containing a first element, the electrolytic solution contains a lithium salt and an imide salt which contains the first element and an imide anion, the compound containing the first element is at least one selected from the group consisting of fluoride, silicide, silicic oxide, and phosphorus oxide, the first element is any one or more elements selected from the group consisting of K, Na, Mg, Ca, Cs, Al, and Zn, and the first element contained in the compound containing the first element in the negative electrode active material layer is the same as the first element contained in the imide salt in the electrolytic solution.

2. The lithium ion secondary battery according to claim 1, wherein, when a total amount of silicon and carbon in the material is 100 wt %, a proportion by weight of silicon is 30 wt % or more and 70 wt % or less and a proportion by weight of carbon is 30 wt % or more and 70 wt % or less.

3. The lithium ion secondary battery according to claim 1, wherein a molarity proportion of the imide salt containing the first element in the electrolytic solution is 5% or more and 20% or less with respect to the molarity proportion of the lithium salt in the electrolytic solution.

4. The lithium ion secondary battery according to claim 1, wherein the negative electrode active material includes a core and a coating layer with which the core is coated, and the coating layer includes a compound containing the first element.

5. The lithium ion secondary battery according to claim 1, wherein a median diameter (D50) of the negative electrode active material is 1 μm or more and 10 μm or less.

* * * * *